Feb. 16, 1932.   M. CURRY   1,845,044
VEHICLE
Original Filed Feb. 25, 1927   2 Sheets-Sheet 1
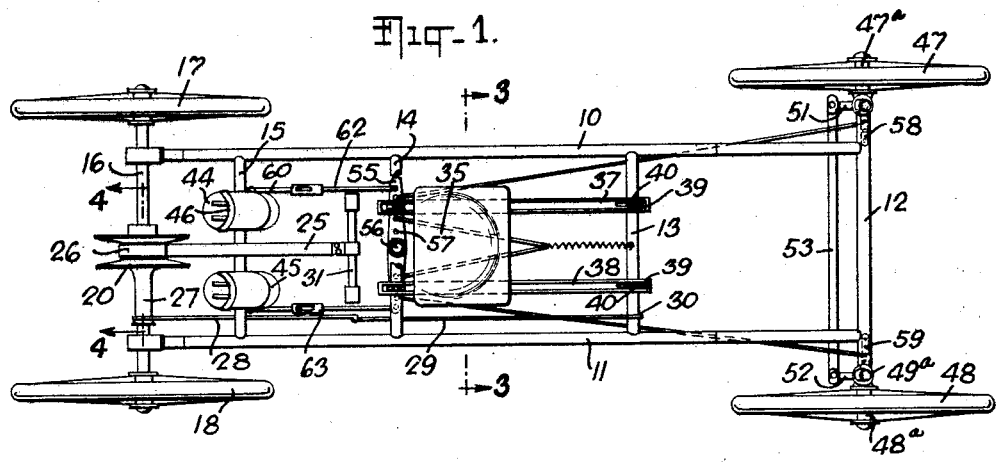
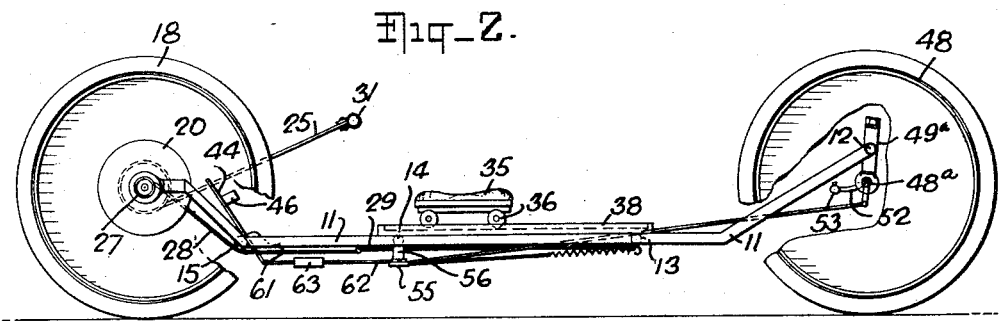
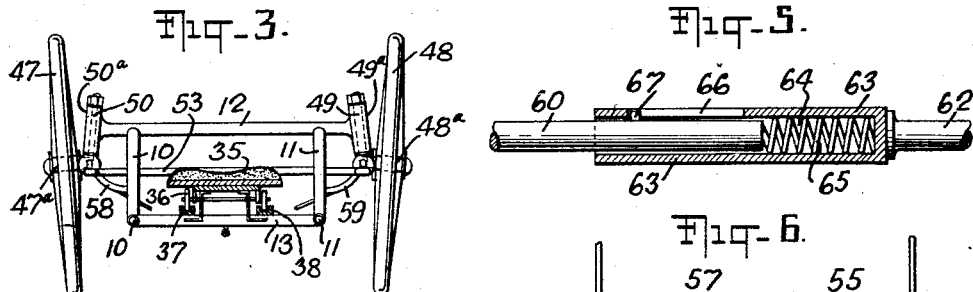
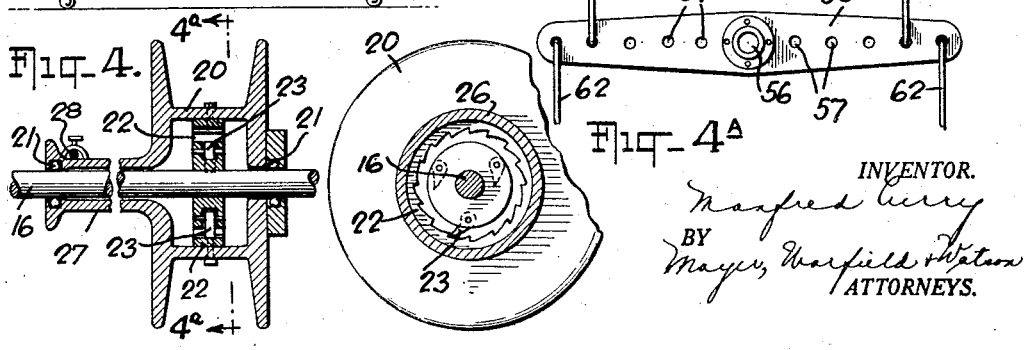

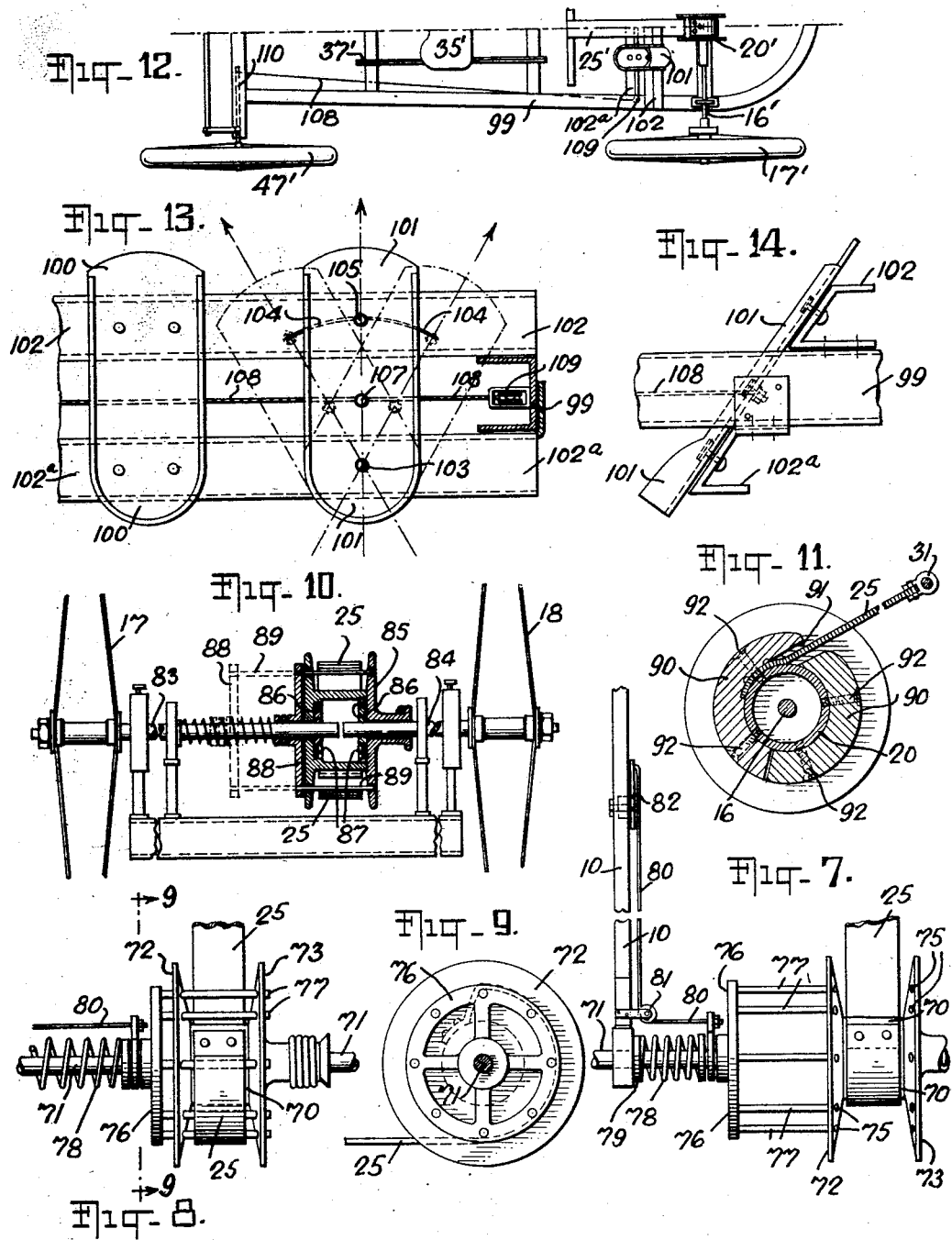

Patented Feb. 16, 1932

1,845,044

UNITED STATES PATENT OFFICE

MANFRED CURRY, OF NEW YORK, N. Y., ASSIGNOR TO CURRY LANDSKIFF CORPORATION, OF NEW YORK, N. Y., A CORPORATION OF NEW YORK

VEHICLE

Application filed February 25, 1927, Serial No. 170,766. Renewed July 9, 1931.

This invention relates to vehicles and to correlated inventions and discoveries appertaining thereto.

An object of the invention is to provide a vehicle of an improved construction.

Another object is to provide an improved type of vehicle adapted to be propelled by a rowing motion of a rider, in which leg, arm and abdominal muscles of the rider are involved.

Another object is to provide an improved type of steering means for vehicles.

Another object is to provide means to permit particularly efficient application of power in a vehicle propelled by the periodic unwinding of a belt from a drum connected with an axle of the vehicle.

Other objects of the invention will in part be obvious and will in part appear hereinafter.

The invention accordingly comprises the features of construction, combination of elements and arrangement of parts which will be exemplified in the constructions hereinafter set forth, and the scope of the application of which will be indicated in the claims.

This application is a continuation in part of my co-pending application Serial No. 108,679, filed May 12, 1926, issued November 12, 1929 as Patent No. 1,735,601.

For a fuller understanding of the nature and objects of the invention, reference should be had to the following detailed description taken in connection with the accompanying drawings, in which:

Figure 1 is a plan view of one type of a vehicle exemplifying the invention;

Fig. 2 is a side view thereof;

Fig. 3 is a sectional view taken along the line 3—3 in the direction of the arrows in Fig. 1;

Fig. 4 is an enlarged detail view taken in cross-section along the line 4—4 in the direction of the arrows in Fig. 1, illustrating one means for transmitting power to the driving axle;

Fig. 4a is a sectional view taken in the direction of the arrow along the line 4a—4a in Fig. 4;

Fig. 5 is an enlarged detail view of a means for preventing unintentional steering;

Fig. 6 is an enlarged detail view of the pivotal cross-bar shown in Fig. 1;

Fig. 7 is a top view of multiple speed mechanism adapted for use in a vehicle such as shown in Fig. 1;

Fig. 8 is a similar view illustrating another position of the mechanism;

Fig. 9 is a side view of this mechanism;

Fig. 10 is a partly sectional front view of a vehicle illustrating an alternate type of axle and transmission mechanism;

Fig. 11 is a sectional view of an alternate arrangement for regulating the application of power in the driving of the vehicle;

Fig. 12 is a plan view of one side of a similar vehicle embodying an alternative type of steering mechanism;

Fig. 13 is an enlarged detail view of the foot-rests and associated parts forming a part of the vehicle shown in Fig. 12; and Fig. 14 is a side elevation of the mechanism shown in Fig. 13.

The invention is directed particularly to the provision of a vehicle adapted to be propelled by a rowing motion of a rider, in which the power of the arm, leg and abdominal muscles of the rider are utilized most efficiently and economically, and which may be steered with ease, accuracy and safety. Such a vehicle, of course, should be sturdily built and yet be of as simple and light-weight construction as possible.

The particular vehicle exemplified in Figs. 1, 2 and 3 includes a frame comprising longitudinal bars 10 and 11 connected by suitable cross-bars such as shown at 12, 13, 14 and 15. Mounted for rotation at the forward ends of the bars 10 and 11 is a preferably hollow axle 16, to which, in the present instance, a pair of wheels 17 and 18 are suitably secured to effectuate a propulsion of the vehicle upon a clockwise rotation of the axle as viewed from the right of the vehicle. For example, the wheels may be fixedly attached to the axle or the wheels may be so mounted thereon that they will be rotated in a clockwise direction by the axle and that they will also be free to rotate in a like direction upon the axle. In order to impart the desired rotative movement directly to the axle 16 for the propulsion of the vehicle, a hollow drum 20 is rotatively mounted on the axle as by means of ball bearings 21, and on the inside of the drum in the present instance, is a ratchet mechanism 22, having inwardly-extending teeth, with which a plurality of pawls 23, carried by the axle 16, co-operate to turn the axle for forward movement of the vehicle upon a clockwise movement of the drum, as viewed from the right, and to permit free movement of the drum on the axle in the opposite direction. A flexible tractive element, such as a leather belt 25, is secured to the drum at 26 and arranged to be wound thereon upon a counter-clockwise movement of the drum, as viewed from the right of the vehicle, and to effectuate through the medium of the drum a rotation of the axle 16 for the propulsion of the vehicle upon the unwinding of the belt. The drum is preferably formed with flanges to retain the belt on the drum as it is wound. In order that the initial portion of unwinding movement of the belt may meet with as little resistance as possible, and that a greater efficiency may be obtained after the inertia involved in imparting an initial propelling movement to the axle has been overcome, it has been found that a relatively thick belt may be advantageously employed. A leather belt one-fourth of an inch thick may be used, for example.

In order normally to effectuate the winding of the belt 25 or similar member, the exemplified drum is provided with a lateral tubular extension 27 on which, in the present instance, there is arranged to be wound, as the belt unwinds, one end of a round leather belt 28 to the other end of which there is secured suitable retractive means. Such means preferably comprise a rubber spring, such as the rubber band 29 fastened at 30 to the cross-piece 13, it having been found that the retractive power of rubber at various elongations is especially well adapted to effectuate the desired rewinding of the belt of the drum.

The free end of the belt 25 is fastened about a gripping rod or handle 31, adapted to extend transversely of the vehicle and to be gripped by a rider sitting upon a seat 35, which is slidably mounted for forward and rearward movement, preferably by means of wheels 36, upon a pair of rails 37 and 38 secured to the cross-pieces 13 and 14.

In order that the muscular force of the rider may be utilized most efficiently in the propulsion of the vehicle, it is desirable that the direction of pull of the belt from the drum be substantially horizontal, and to this end the rails 37 and 38 are in the present instance so positioned that the seat 35 is below a horizontal plane extending through the axle 16. In the present exemplification these rails are provided at either end thereof with longitudinal slots 39 to permit them to be adjustably secured to the cross-pieces 13 and 14 by means of bolts 40, so that the position of the rails may be readily adjusted to adapt the mechanism for the most efficient use by riders of various heights.

A pair of foot-rests 44 and 45 for the rider are, in the present instance, mounted on the cross-piece 15 for movement intermediate their ends on an axis parallel to the cross-piece, and are arranged so as to permit the rider to cause a movement of the seat 35 in one direction by pressure on the foot-rests and in the opposite direction by a retractive movement of his legs. Suitable means, such as straps 46, are provided to retain the feet of the rider against the foot-rests. At the rear of the vehicle there are provided a pair of steering wheels 47 and 48 mounted for rotation on axles 47a and 48a, the respective posts 50 and 49 of which are rotatively secured in casings 50a and 49a, integral with the cross-piece 12. Uniform movement of the two wheels is secured by connecting means, consisting in the present instance of a pair of rods 51 and 52, extending forwardly from the foot of the posts 50 and 49, and pivotally secured at their forward ends with a connecting bar 53. In the present instance, movement of the steering wheels is effectuated by means of axial movement of the foot-rests 44 and 45, through the medium of a transverse bar 55 pivotally secured at its center to the cross-piece 14 at 56. Each arm of the bar 55 exemplified is provided with a series of perforations 57, at any of which there may be secured to the bar suitable connecting members such as are provided in the instant case between the foot-rests and the bar 55, and between the bar 55 and a pair of forwardly-extending steering levers 58 and 59 secured to the axles 47a and 48a respectively.

The connection between each foot-rest and the bar 55 consists, in the present instance, of a rod 60, pivotally secured to the base of the foot-rest at 61, and a rod 62 secured to the cross-bar 55 at one of the perforations 57 in one arm of the bar. The rods 60 and 62 are provided with a lost-motion connection therebetween, whereby the initial movement of the foot-rests may be absorbed and the accidental steering of the vehicle prevented. As exemplified, this lost-motion connection consists of a housing 63 secured to the rear rod 62 and arranged to receive the rear end of the forward rod 60 and normally to provide a space 64 (see Fig. 5) between the end of the rod 60 and the rear of the housing, in which space a coiled spring 65 is positioned normally to maintain the end of the rod 60 out of the space 64. In order positively to limit the movements of the rod 60 with respect to the housing 63 in both directions, the housing is provided with a slot 66 in its upper surface, into which there extends a pin 67 from the rod 60.

In order that the power applied in unwinding the belt of a vehicle, such as exemplified, may be utilized most efficiently, it is in certain instances desirable to employ a multiple speed mechanism; and Figs. 7, 8 and 9 illustrate an arrangement whereby such a mechanism may be utilized in connection with a drum of the general type shown in Fig. 4. In this exemplification a drum 70, mounted on an axle 71, is formed with flanges 72 and 73, each provided with a circular series of mutually aligned perforations 75, and there is slidably mounted adjacent the drum a disc 76 carrying a series of rods 77, each of which is adapted to extend through corresponding pairs of perforations in the two flanges of the drum. Thus when a member such as the belt 25 is unwound, the disc 76 may be moved toward the drum 70 so as to thrust the rods 77 through the corresponding perforations in the flanges 72 and 73 respectively, and the drum then rotated as by suitable means to rewind the belt. The belt will then be rewound about the rods 77 instead of upon the surface of the drum, and low speed mechanism thus provided for the vehicle. Any suitable means may, of course, be provided whereby the disc 76 may be thrust toward and drawn away from the drum. One such means, exemplified in Figs. 7 and 8, comprises a coil-spring 78 positioned between the disc 76 and a stop 79, and normally tending to thrust the disc toward the drum, and a cable 80 leading from the disc over a sheave 81 to the base of a lever 82 pivoted on the frame member 10.

In certain instances when a pair of driving wheels are employed it is desirable to employ individual axles therefor. Such an arrangement, wherein the axles rotate on the same transverse axis, and constitute in effect a divided axle, is shown in Fig. 10, and as exemplified, is adapted to be utilized in connection with a vehicle such as shown in Fig. 1. In this exemplification an axle 83 extends inwardly from the wheel 17 and an axle 84 extends inwardly from the wheel 18, and a drum 85 is fitted about the adjacent ends of these axles. The drum in this case is provided at either side with a circular ratchet 86, the teeth of which extend inwardly toward the axles 83 and 84 respectively, and each axle carries a plurality of co-operating pawls 87 corresponding to the pawls 23. This arrangement not only relieves strain on the axle, but permits a varied movement of the driving wheels such as is desirable when the vehicle is turning. The flanges of the drum 85, as exemplified, moreover, are also formed with a series of aligned perforations and there is provided a disc 88 with rods 89 similar to the disc 76 and its rods 77.

In certain instances, moreover, where the use to which the vehicle is to be put does not require a multiple speed mechanism such as shown in Figs. 7 to 9, it is nevertheless desirable to provide means whereby the size of the drum may be increased to adapt a standard vehicle for use by persons having less than normal strength, and one such arrangement whereby the same may be accomplished is shown in Fig. 11. In this exemplification there is provided in connection with a drum, such as the drum 20, a plurality of blocks 90 adapted to be fastened to the surface of the drum and to provide a substantially annular outer surface, with the exception of a slot 91 provided between the blocks to receive that portion of a belt such as 25 attached to the drum. These blocks may be secured to the drum by suitable means, such as screws 92, which may be unfastened to permit the removal of the blocks when the vehicle is used by a person of normal strength.

There is illustrated in Figs. 12, 13 and 14 a modified form of vehicle in which an alternate type of steering mechanism is employed. The vehicle includes wheels 17' and 47' and a frame 99. A drum 20' mounted on a front axle 16' and arranged to impart movement to the axle in response to the unwinding of a belt 25'; and a seat 35', slidably mounted on a rail, a pair of rails 37', is provided for the rider—the primed members referring to members similar to like numbered members in Fig. 1. The feet of the rider rest upon a pair of foot-rests 100 and 101, which are mounted upon parallel cross-pieces 102 and 102a, forming a part of the frame, and set at a suitable angle to permit, in driving, the most effective pressure on the foot-rests by the feet of the driver. In the present instance, the foot-rest 100 is immovably mounted against the cross-pieces 102 and 102a, and the foot-rest 101 is pivotally secured upon the cross-piece 102a at 103 in such manner that the upper or forward portion thereof may be swung through an arc transverse of the vehicle frame. For the purpose of guiding this foot-rest during its movement, there is provided a slot 104 in the cross-bar 102 and a co-operating bolt 105 in the foot-rest, the bolt 105 serving to prevent the foot-rest from being lifted from the cross-bar when the rider bends his legs to pull himself and the seat 35 forward. The foot-rest is rigidly connected at a point 107 to a rope or cable 108, which extends transversely of the vehicle and over sheaves 109 secured at either side of the vehicle frame. From each sheave 109 each end of the rope 108 extends rearwardly to one of a pair of levers 110 which are rigidly connected with the axles of the wheels 47', respectively. It will be apparent, of course, that, if desired, both of the foot-rests may be pivotally mounted.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween:

Having described my invention, what I claim as new and desire to secure by Letters Patent is:

1. In a vehicle of the character described and including front and rear wheels and a frame, in combination, a pair of individual foot-rests each mounted on said frame for movement on a fixed axis transverse of said frame, said rear wheel or wheels being arranged to have steering movements imparted thereto, and connections extending rearwardly from said foot-rests and arranged to impart steering movement to said rear wheel or wheels in response to movement of said foot-rests.

2. In a vehicle of the character described and including wheels and a frame, in combination, a pair of individual foot-rests each mounted on said frame for movement on a fixed axis transverse of said frame, a centrally-pivoted transverse bar spaced rearwardly from said foot-rests, a substantially inflexible connection extending respectively from each foot-rest to each arm of said bar, and connections between said bar and at least one of said wheels for steering the vehicle.

3. In a vehicle including wheels and a frame, of the type wherein there is applied to at least one of said wheels for the propulsion of said vehicle power derived from a rowing movement of a rider involving leg, arm and abdominal muscles, foot-rests for said rider, at least one of said foot-rests being mounted for lateral movement, and means to transmit movement of said foot-rests to at least one of said wheels for steering the vehicle.

4. In a vehicle including wheels and a frame, in combination, a foot-rest having a pressure surface and mounted on said frame for movement on an axis substantially perpendicular to said surface of the foot-rest, and means to transmit axial movement of said foot-rest to at least one of said wheels for steering the vehicle.

5. In a vehicle including wheels and a frame, in combination, means to impart a movement of at least one foot of a rider to at least one of said wheels for steering the vehicle, said means including a centrally-pivoted transverse bar, connections between the arms of said bar and said foot-rests and between the arms of said bar and a pair of wheels; resilient means opposing such steering movement normally to maintain all of said wheels in alignment, and connections between said resilient means and the arms of said bar.

6. In a vehicle including wheels and a frame, in combination, a foot-rest movably mounted on said frame, a transverse bar pivotally mounted on said frame, connections between said foot-rest and said transverse bar, means to control the steering of said vehicle in response to the movements of said pivoted bar, and a spring connected to said bar at either side of its pivot point and arranged to maintain said bar normally in a given position.

7. In a vehicle including wheels and a frame, of the type wherein there is applied to at least one of said wheels for the propulsion of the vehicle power derived from a rowing movement of a rider involving leg, arm and abdominal muscles, means to impart movement of at least one foot of a rider to a pair of wheels to steer the vehicle, means to adjust the degree of response of said steering wheels to said foot movement, and mechanism included in said steering means to render inoperative the initial portion of said foot movement.

8. In a vehicle of the type wherein power derived from movements of the rider involving pressure against a foot-rest is utilized for the propulsion of the vehicle, and including wheels and a frame, in combination, a foot-rest movably mounted on said frame, and means for steering said vehicle in response to a movement of said foot-rest, said latter means including mechanism arranged to render the initial portion of the movement of said foot-rest inoperative for steering the said vehicle.

9. In a vehicle including wheels and a frame, in combination, a foot-rest movably mounted on said frame and means for steering said vehicle in response to a movement of said foot-rest, said means including a rigid connecting member formed in two pieces with a lost motion connection therebetween, and a spring tending to oppose operation of said lost motion connection.

10. In a vehicle including wheels and a frame, in combination, a foot-rest movably mounted on said frame, means to impart a steering movement to certain of said wheels in response to the movement of said foot-rest, said means being arranged for adjustment whereby the degree of response of said certain of said wheels to a given movement of said foot-rest may be regulated.

11. In a vehicle including wheels and a frame, a pair of foot-rests mounted on said frame for movement on an axis transverse thereto, a centrally-pivoted transverse bar spaced from said foot-rests, a connecting rod arranged to extend respectively from each foot-rest to each arm of said bar, a connection arranged to extend from said bar and at least one of said wheels for imparting steering movements thereto, each arm of said transverse bar having formed therein a series of perforations, and means to attach said connecting rods and said connections to said transverse bar at any of a plurality of said perforations.

12. In a vehicle including wheels and a frame, in combination, an axle having one of said wheels rotatively mounted thereon, said axle being mounted on said frame for movement whereby said wheel may be moved for steering the vehicle, means including a lever for effectuating such movement of said axle, a series of perforations formed in said lever, a foot-rest movably mounted on said frame, means for imparting a movement of said foot-rest to said lever for steering the vehicle, said latter means including a connection arranged to be attached to said lever at any of said perforations.

13. In a vehicle of the type wherein power derived from movements of a rider involving pressure against a foot-rest are utilized in the propulsion of the vehicle, in combination, a foot-rest adapted to have steering movements imparted thereto, means for connecting said foot-rest with at least one of the wheels of said vehicle to steer the same, said steering means being arranged for adjustment whereby the degree of response of said wheel of said foot-rest may be regulated.

14. In a vehicle including wheels and a frame, in combination, an axle having one of said wheels rotatively mounted thereon, said axle being mounted on said frame for movement whereby said wheel may be moved for steering the vehicle, means including a lever for effectuating such movement of said axle, a series of perforations formed in said lever, a foot-rest movably mounted on said frame, means for imparting a movement of said foot-rest to said lever for steering the vehicle, said latter means including a connection arranged to be attached to said lever at any of said perforations, and a spring connected to at least one of the perforations in said lever and adapted to oppose the steering action and normally to maintain all of said wheels in alignment.

In testimony whereof I affix my signature.

MANFRED CURRY.